United States Patent [19]

Kubalak et al.

[11] 4,347,496
[45] Aug. 31, 1982

[54] ELECTRONIC FUEL MANAGEMENT SYSTEM

[76] Inventors: Thomas P. Kubalak, 1112 - 45th Ave. NE., Minneapolis, Minn. 55421; Gene M. Berghoff, 6923 Woodland Dr., Eden Prairie, Minn. 55344; William J. Palmer, 4800 W. 111th, Bloomington, Minn. 55437

[21] Appl. No.: 128,517

[22] Filed: Mar. 10, 1980

[51] Int. Cl.³ .................. B60Q 1/34; H01H 35/06
[52] U.S. Cl. .................. 340/52 R; 200/61.45 R; 340/52 H; 340/669
[58] Field of Search .......... 340/52 R, 52 H, 669; 200/61.45 R, 61.47, 61.52, 52 A

[56] References Cited

U.S. PATENT DOCUMENTS

| | | | |
|---|---|---|---|
| 3,440,603 | 4/1969 | Cochran | 340/52 R |
| 3,898,613 | 8/1975 | Nahikian et al. | 340/52 H X |
| 3,946,359 | 3/1976 | Henderson | 340/52 H |
| 3,967,135 | 6/1976 | Balban et al. | 340/52 H X |

*Primary Examiner*—John W. Caldwell, Sr.
*Assistant Examiner*—Joseph E. Nowicki
*Attorney, Agent, or Firm*—Orrin M. Haugen; Thomas J. Nikolai

[57] ABSTRACT

A device to be used in connection with an automotive vehicle for indicating rates of acceleration above pre-set thresholds so that the vehicle operator may change such rate in a fashion to reduce fuel consumption. The device includes a box-like housing containing a mercury switch having two electrodes located at a first end thereof and which are adapted to be bridged when the mercury mass moves under the influence of acceleration forces. These electrodes are connected in a series circuit with a source of electrical potential and an indicator means such that a signal is given when and if the vehicle is accelerated at a rate above an adjustable, pre-set level.

2 Claims, 3 Drawing Figures

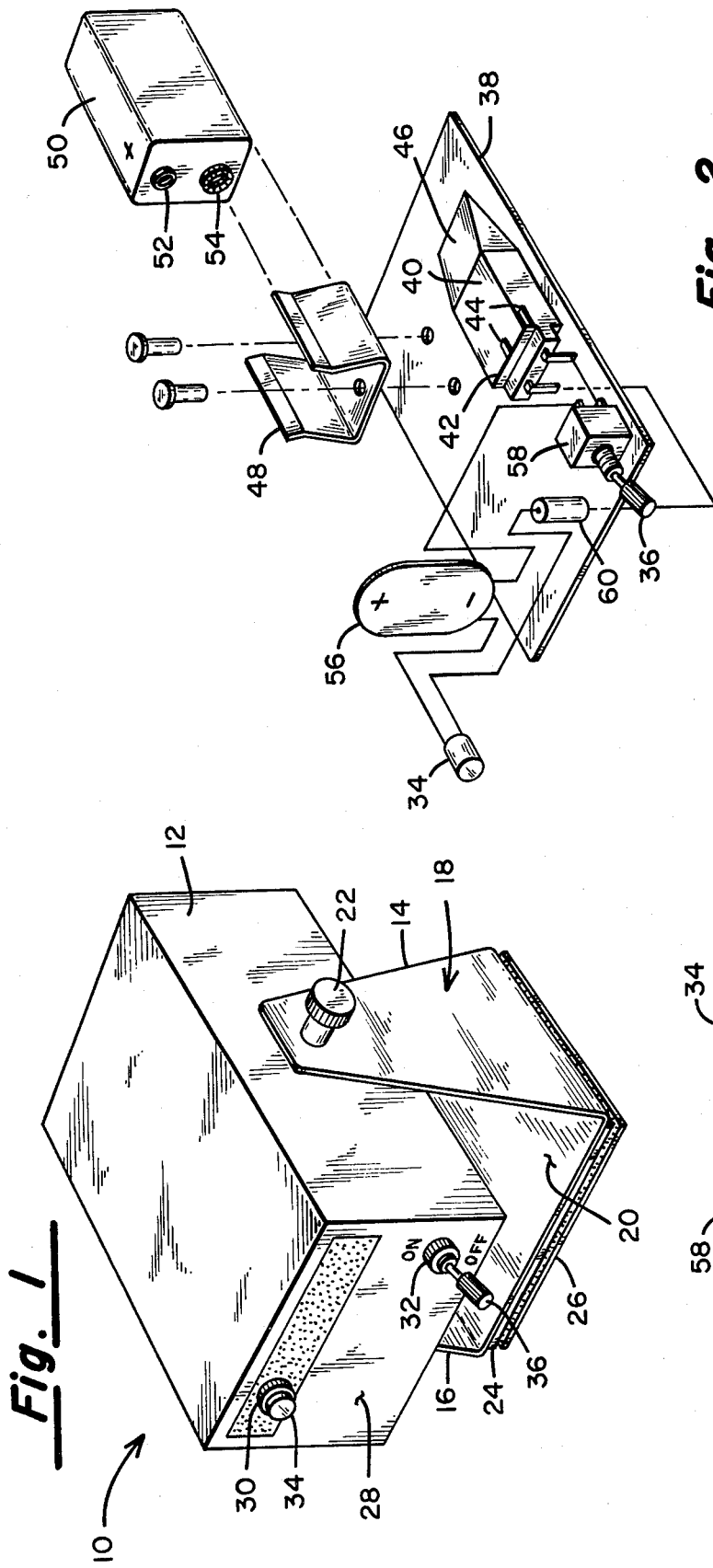

ELECTRONIC FUEL MANAGEMENT SYSTEM

BACKGROUND OF THE INVENTION

I. Field of the Invention

This invention relates generally to an acceleration indicator, and more specifically to a simple, low-cost accessory for a motor vehicle which can be used to condition the vehicle operator against excessive, fuel-wasting accelerations.

II. Discussion of the Prior Art

With the increasing scarcity and sky-rocketing costs of gasoline and other fuels useful in powering internal combustion engines commonly found in various types of vehicles, it is deemed advantageous to provide a means for signaling any excess use of fuel due to poor driving habits. It is well-known that so-called jack-rabbit starts of an automobile from a stop position is extremely wasteful of fuel and, similarly, sudden changes in acceleration when traveling at operating speed also contributes to increased fuel consumption.

Persons who have not been conditioned to smooth, steadily increasing velocities (slow acceleration) may not realize that their ingrained driving habits result in significant drops in fuel economy. It is the general purpose of the present invention to alleviate that problem by providing a low-cost, portable, easily installed acceleration signaling device which may be adjusted to provide a visual or aural manifestation whenever vehicle accelerations exceed a preset value.

SUMMARY OF THE INVENTION

To achieve the foregoing purpose, there is provided a series electrical circuit of a source of voltage, preferably a DC battery, an indicating device such as a lamp or buzzer, a single pole-single throw on-off control switch and an acceleration sensitive switch, the foregoing series circuit being disposed within a housing having a longitudinal axis and a transverse axis. The acceleration sensitive switch is preferably a mercury switch of the type wherein a globule of mercury is contained within a tubular container, there being a set of contacts at one end of the container, the container being sufficiently elongated that the conductive mass in the form of the mercury globule can be displaced from a bridging relationship with respect to the contacts. The mercury switch is positioned within the housing so as to have its lengthwise axis aligned parallel to the longitudinal axis of the box-like housing.

Next, a bracket member is provided which is generally U-shaped and which is provided at its base portion with a means for readily affixing the bracket to a surface within the vehicle which may be considered generally horizontal. Typically, the dashboard of a automobile or a truck provides such a surface. The two legs of the U-shaped bracket encompass the box-like housing and means are provided for pivotally securing the housing such that it can be rotated about its transverse axis to assume a desired degree of inclination with respect to the horizontal. Through this means, the sensitivity of the device to acceleration forces can be set at a desired value.

OBJECTS

It is accordingly the principal object of the present invention to provide a simple, low-cost portable device for use in signaling excessive accelerations in fuel consuming vehicles.

Another object of the invention is to provide a self-contained acceleration sensing and signaling device which may easily be installed in and removed from a motor vehicle or the like.

A still further object of the invention is to provide a means whereby a motor vehicle operator is aided in overcoming driving habits which are wasteful of fuel.

A still further object of the invention is to provide an electronic fuel management device which may be easily positioned on the dashboard of an automobile to consistently and accurately monitor and signal the possibility of excess use of fuel due to poor driving habits.

These and other objects and advantages of the invention will become apparent to those skilled in the art from the following detailed description of a preferred embodiment when considered in conjunction with the accompanying drawings in which:

DESCRIPTION OF THE DRAWING

FIG. 1 is a perspective drawing of the mechanical construction of a preferred embodiment;

FIG. 2 is an exploded view showing the internal arrangement of the circuit components contained within the housing structure of FIG. 1; and FIG. 3 is an electrical circuit schematic of the apparatus.

DESCRIPTION OF THE PREFERRED EMBODIMENT

Referring first to FIG. 1, there is indicated generally by numeral 10 the acceleration sensing and indicating device of the present invention. As is illustrated, a housing 12 is provided which may be generally box-like in construction and which is preferably formed from metal or plastic. The exterior shape of the housing 12 is not deemed altogether critical and can comprise any of a number of three-dimensional shapes so long as it defines relative longitudinal and transverse axes. As such, rather than being generally rectangular, the housing may be ovaloid or some other shape deemed aesthetically pleasing.

The enclosure 12 is adapted to be suspended between the upwardly extending legs 14 and 16 of a generally U-shaped bracket indicated generally by numeral 18. The legs 14 and 16 are spaced apart from one another and extend at right angles from a base portion 20.

The housing 12 is pivotally suspended about a transverse axis thereof by means of screws (not shown) which pass through apertures formed in the leg members 14 and 16 and through the side walls of the housing 12. A knob 22 joined to one of the screws provides a means whereby the user may adjust the angle of inclination of the longitudinal axis of the housing 12 with respect to the horizontal and then maintain that preset angle by tightening down the knob 22.

To facilitate the attachment of the device of FIG. 1 to a dashboard or the like in a motor vehicle, a Velcro-type separable fastener having pressure sensitive adhesive backing on each element thereof is provided, the Velcro members being identified by numerals 24 and 26 respectively. The Velcro member 24 is preferably adhesively attached to the undersurface of the base portion 20 of the bracket 18 with its hooks or loops (as the case may be) extending outwardly from said base portion. Similarly, the portion 26 of the Velcro fastener is adapted to be adhesively bonded to the dashboard of the vehicle at a desired location. Using this technique, the device 10 may readily be installed on and removed from the dashboard.

The housing 12 is provided with a control panel 28 having first and second apertures 30 and 32 formed therethrough. Mounted in the aperture 30 is a indictor device which, in the preferred embodiment, may comprise a light emitting diode 34 where a visual manifestation is desired or, alternatively may comprise an electrically operated sound producing device where an aural manifestation is desired.

Extending through the second aperture 32 formed on the control panel 28 of the housing 12 is the toggle lever portion 36 of a single pole-single throw on-off switch.

Now that the mechanical features of the device have been set forth with particularity, consideration will be given to the electrical components which are arranged to be contained within the housing 12. In this regard, reference is made to the exploded view of FIG. 2.

Referring to FIG. 2, there is shown a board or substrate 38 which is dimensioned so as to fit within the confines of the housing 12 and which will be in a plane which is generally parallel to the top and bottom of the housing 12. Fastened to the board 38 is a generally tubular container 40 which enshrouds a mass (not shown), the mass preferably being a conductive liquid such as a globule of mercury. As is illustrated, the container 40 is generally elongated and at the forward end 42 thereof there is provided a set of spaced apart electrodes or contacts identified by numeral 44. The container 40 is sufficiently long and the size of the mass is such that the mass may be displaced toward the rearward end 46 of the container so as to be in a non-bridging relationship with respect to the contact members 44. The longitudinal axis of the container 40 is generally aligned with the longitudinal axis of the housing 12. Also attached to the substrate 38 is a spring clip member 48 designed to resiliently engage and hold a source of DC potential such as a battery 50. The battery 50 may be of the type commonly used in portable transistor radios and other devices of like type, having a nominal voltage of nine volts. Batteries of this type are provided with snap-type connectors 52 and 54 which are arranged to mate with corresponding snaps on a connector element or battery terminal member 56.

Also mounted on the substrate 38 is the on-off control switch 58 which is positioned on the substrate at its forward end such that when inserted into the housing, the toggle lever 36 will extend through the aperture 32 formed on the control panel 28. Wired in series circuit with the battery terminal member 56 is a current limiting resistor 60 and the indicator means, here shown as a LED 34.

With reference to FIG. 3, a more detailed circuit schematic is provided. As is represented, the battery supply 50 has a first terminal connected to a pole of the single pole-single throw on-off switch 58 and the remaining contact of that switch is connected to the anode of a LED device 34. The cathode electrode of the LED 34 is connected to a first terminal of a current limiting resistor 60 and the second terminal of that resistor is, in turn, coupled to one of the contacts 44 of the mercury switch 40. The remaining terminal of that switch is, in turn, connected to the negative terminal of the battery supply 50.

It can be seen, then, that when the on-off switch is in its on position and the electrically conductive liquid mass (the mercury) bridges the contacts 44, a series electrical circuit is completed through the LED device 34 causing it to provide a visually perceptible glow.

Once the device 10 is mounted on the dashboard of a vehicle in a position where the visual indicator (LED) 34 is in the operator's line of sight, and the angle of inclination of the housing 12 is set at a desired value by the knob 22, with the switch 58 in its "on" position, when the operator of the motor vehicle accelerates, the conductive liquid in the container 40 will tend to shift from the end 46 to a second location wherein it bridges the contacts 44 to complete the circuit. However, if the rate of change of velocity with respect to time is sufficiently low, the conductive liquid mass will not be operated on with a sufficient force to cause it to shift into its contact bridging relationship with respect to contacts 44 and the LED will remain extinguished. It is readily apparent, then, that the sensitivity of the device to acceleration may be adjusted by manipulating the angle of inclination of the housing 12.

The "on-off" switch 50 should be set in its "off" position when the vehicle is parked on a hill where the inclination of the vehicle may result in the displacement of the mass to its contact bridging location in the container 40.

The invention has been described herein in considerable detail, in order to comply with the Patent Statutes and to provide those skilled in the art with information needed to apply the novel principles, and to construct and use such specialized components as are required. However, it is to be understood that the invention can be carried out by specifically different equipment and devices, and that various modifications, both as to equipment details and operating procedures can be effected without departing from the scope of the invention itself.

What is claimed is:

1. Apparatus for indicating when the acceleration of a device in a selected direction exceeds a predetermined value, comprising, in combination:
   (a) a housing having a longitudinal axis;
   (b) switch means mounted in the housing, including an electrically conductive acceleration responsive mass movable in a direction aligned with said longitudinal axis, and a plurality of electrical contacts disposed at one end of said switch means for bridging contact by said mass when moved to said one end;
   (c) a light emitting diode mounted in said housing and visible from without said housing;
   (d) a disabling switch mounted in said housing and operable from without said housing;
   (e) a battery removably mounted within said housing;
   (f) means connecting said battery, said switch means, said diode, and said disabling switch in a series circuit;
   (g) a support bracket having a base surface and support legs extending from said surface;
   (h) means carried by said legs for engaging sides of said housing in adjustable supporting relation about a pivotal axis orthogonal to said longitudinal axis;
   (i) Velcro loop and hook means for removably fastening said base surface to a generally flat mounting portion of the device, with said pivotal axis generally horizontal and said directions in alignment;
   (j) and means fixing the adjusted position of said housing about said pivotal axis to determine the acceleration required to move said mass into bridging engagement with said contacts.

2. Apparatus for indicating when the acceleration of a device in a selected direction exceeds a predetermined value, comprising, in combination:
 (a) a housing having a longitudinal axis;
 (b) switch means mounted in the housing, including an electrically conductive acceleration responsive mass movable in a direction aligned with said longitudinal axis, and a plurality of electrical contacts disposed at one end of said switch means for bridging contact by said mass when moved to said one end;
 (c) a light emitting diode mounted in said housing and visible from without said housing;
 (d) a battery removably mounted within said housing;
 (e) means connecting said battery, said switch means, and said diode in a series circuit;
 (f) a support bracket having a base surface and support legs extending from said surface;
 (g) means carried by said legs for engaging sides of said housing in adjustable supporting relation about a pivotal axis orthogonal to said longitudinal axis;
 (h) Velcro loop and hook means for removably fastening said base surface to a generally flat mounting portion of the device, with said pivotal axis generally horizontal and said directions in alignment;
 (i) and means fixing the adjusted position of said housing about said pivotal axis to determine the acceleration required to move said mass into bridging engagement with said contacts.

* * * * *